(12) United States Patent
Kim et al.

(10) Patent No.: US 8,169,566 B2
(45) Date of Patent: May 1, 2012

(54) BACKLIGHT UNIT AND LIQUID CRYSTAL DEVICE HAVING THE SAME

(75) Inventors: Gi Bin Kim, Gyeonggi-Do (KR); Eun Ju Kim, Gyeonggi-Do (KR)

(73) Assignee: LG Display Co., Ltd., Seoul (KR)

( * ) Notice: Subject to any disclaimer, the term of this patent is extended or adjusted under 35 U.S.C. 154(b) by 845 days.

(21) Appl. No.: 11/319,220

(22) Filed: Dec. 28, 2005

(65) Prior Publication Data

US 2006/0187372 A1    Aug. 24, 2006

(30) Foreign Application Priority Data

Feb. 22, 2005    (KR) .................. 10-2005-0014695

(51) Int. Cl.
*G02F 1/1335*    (2006.01)

(52) U.S. Cl. .......................................... 349/64

(58) Field of Classification Search ............ 349/58, 349/65, 64
See application file for complete search history.

(56) References Cited

U.S. PATENT DOCUMENTS

| | | | | |
|---|---|---|---|---|
| 5,654,779 | A * | 8/1997 | Nakayama et al. | 349/58 |
| 6,407,781 | B2 * | 6/2002 | Kitada | 349/58 |
| 6,885,411 | B2 * | 4/2005 | Ogawa et al. | 349/58 |
| 7,113,237 | B2 * | 9/2006 | Nitto et al. | 349/58 |
| 7,161,642 | B2 * | 1/2007 | Kim et al. | 349/58 |
| 7,259,810 | B2 * | 8/2007 | Kim | 349/67 |
| 7,275,852 | B2 * | 10/2007 | Kim et al. | 362/612 |
| 7,327,416 | B2 * | 2/2008 | Lee et al. | 349/65 |
| 7,460,196 | B2 * | 12/2008 | Kim et al. | 349/64 |
| 2003/0223020 | A1 * | 12/2003 | Lee | 349/58 |
| 2003/0234895 | A1 * | 12/2003 | Sugawara et al. | 349/58 |
| 2004/0114372 | A1 * | 6/2004 | Han et al. | 362/330 |
| 2004/0135936 | A1 * | 7/2004 | Lee | 349/64 |
| 2004/0179151 | A1 * | 9/2004 | Lee | 349/58 |
| 2004/0227870 | A1 * | 11/2004 | Jang | 349/64 |
| 2005/0088586 | A1 * | 4/2005 | Mori et al. | 349/62 |
| 2005/0105011 | A1 * | 5/2005 | An | 349/58 |
| 2005/0151894 | A1 * | 7/2005 | Katsuda et al. | 349/58 |
| 2005/0281050 | A1 * | 12/2005 | Chou | 362/612 |
| 2006/0055839 | A1 * | 3/2006 | Hirao et al. | 349/58 |
| 2006/0092666 | A1 * | 5/2006 | Jeong et al. | 362/613 |

FOREIGN PATENT DOCUMENTS

| | | |
|---|---|---|
| CN | 2391269 Y | 8/2000 |
| CN | 1538221 A | 10/2004 |
| CN | 1549013 A | 11/2004 |

* cited by examiner

*Primary Examiner* — Thanh-Nhan P. Nguyen

(74) *Attorney, Agent, or Firm* — Morgan, Lewis & Bockius LLP

(57) ABSTRACT

A backlight unit includes a light source, a lower frame including of a lighting unit supporting portion for supporting the light source and a liquid crystal display (LCD) panel supporting portion having a lower thermal conductivity than the lighting unit supporting portion, a reflection plate formed between the light source and the lower frame, and an upper frame coupled to the lower frame.

7 Claims, 3 Drawing Sheets

BACKLIGHT UNIT AND LIQUID CRYSTAL DEVICE HAVING THE SAME

This application claims the benefit of the Korean Patent Application No. 2005-0014695 filed on Feb. 22, 2005, which is hereby incorporated by reference.

BACKGROUND OF THE INVENTION

1. Field of the Invention

The present invention relates to a liquid crystal display (LCD) device, and more particularly, to a backlight unit for an LCD device.

2. Discussion of the Related Art

Among flat panel display devices currently in use, liquid crystal display (LCD) devices are widely applied to notebook computers, display monitors, televisions, aircraft, spacecraft, and other electronic applications. An LCD device is generally constructed of an LCD panel, a driving circuit unit, and a backlight unit.

The LCD panel includes a thin film transistor (TFT) array substrate, a color filter substrate attached to the TFT array substrate having a certain gap, and a liquid crystal layer formed therebetween. A polarizer is typically attached to an outer portion of each of the two substrates. The driving circuit unit generally includes various kinds of electric circuits mounted on a printed circuit board (PCB). The backlight unit generally includes a light emitting lamp, various kinds of optical sheets, and a supporting mold.

The LCD panel displays an image by controlling an amount of light passing therethrough. The driving circuit unit applies various kinds of signals transmitted from the electronic system to the LCD panel to thereby control the signals. The backlight unit serves as a light emitting unit for evenly irradiating light to the LCD panel.

In general, backlight units are a source of inefficiency in LCD devices because the backlight contributes to increase in thickness, weight, and power consumption. However, because the LCD panel cannot be used without a light source, research is continuing to develop backlight units that uniformly irradiate light onto a display surface while reducing their inefficiencies.

In particular, a backlight unit serving as a light source for the LCD device has to emit light having high illumination intensity while drawing minimum amounts of power. Moreover, the backlight unit needs to be able to convert linear fluorescent light into planar light so that light is irradiated evenly on every surface of the LCD device with the same brightness.

Backlight units are generally categorized as a direct-type, a side-type, or an edge-type according to the position of a light emitting lamp. In the direct-type backlight, light is irradiated from a rear surface of the LCD panel towards a front surface of the LCD panel. In the side-type backlight, light is irradiated from a side surface of a light guide plate to be transmitted to the front surface of the LCD device via the light guide plate. In the edge-type backlight, light is irradiated from one side surface of an inclined light guide plate to be transmitted to the front surface of the LCD device via the inclined light guide plate.

The side-type backlight includes a light emitting lamp for emitting light, a lamp cover for covering the light emitting lamp, and a reflection sheet for reflecting light transmitted to a rear surface of an LCD panel into a light guide plate. The light guide plate has small glass beads formed as dots on a lower surface to scatter the light from the light emitting lamp. A diffusion sheet diffuses the light illuminated from the light guide plate and prevents the dot patterns printed on the light guide plate from shining the scattered light directly to the viewer's eyes. Because intensity of the light is decreased when the light passes through the diffusion sheet, a prism sheet is used to focus the light that has passed through the diffusion sheet to increase the brightness of the light. A protection sheet is formed over the LCD device to protect the LCD device from external impact or foreign materials, and a mold frame supports the components that make up the LCD device.

Generally, the side-type backlight has a low brightness since the light emitting lamp is installed at an outer surface of the light guide plate and light passes through the light guide plate. In order to illuminate the entire surface of the liquid crystal panel, the light guide plate needs to have a high optical design and a processing technique for a uniform brightness. Accordingly, the side-type backlight is mainly used for thin LCD devices, such as a notebook computer.

The conventional direct-type backlight is typically used for LCD devices having a large screen and requiring high brightness rather than a thin profile. For these types of applications, there is no need for a light guide plate and therefore typically uses a cold cathode fluorescent lamp (CCFL) as a light emitting lamp. The light emitting lamp is typically formed as a plurality of straight pipes, a U-shaped pipe, or a W-shaped pipe.

The direct-type backlight includes a liquid crystal panel, a frame for mounting the liquid crystal panel, and a backlight housing installed in the frame. The backlight housing is provided with a light emitting lamp and a light shielding plate, a transparent film, a diffusion plate, and other optical sheets are provided over the light emitting lamp. A reflection plate typically formed of an aluminum based material is provided at a lower portion of the backlight housing.

The light shielding plate is arranged on the light emitting lamp in order to control the brightness of light emitted from the light emitting lamp. The light shielding plate usually has dots printed on a poly-ethylene film, for example, according to the shape of the light emitting lamp. The transparent film is arranged on the light shielding plate, and the diffusion plate is arranged on the transparent film. The transparent film forms an optical space between the diffusion plate and the light emitting lamp.

Light that has passed through the light shielding plate is made to be incident on the diffusion plate with a wide angle, thereby enhancing a diffusion characteristic of the light. The diffusion plate is made of an optical material coated on both surfaces of a film formed of a transparent resin, for example. The backlight is inserted into the frame where the LCD panel, the printed circuit board, and other related components are mounted.

One way of supplying power to a backlight unit is to have a plurality of light emitting lamps connected to one another arranged on a flat plate. However, when an alternating current is applied to the flat plate, only a few lamps emit light. Therefore, each of the light emitting lamps has to be driven by an individual inverter. In other words, power needs to be supplied to each of the light emitting lamps individually.

In previous conventional direct-type backlight units, a cold cathode fluorescent lamp (CCFL) having a high optical efficiency was used as a light emitting lamp. However, because a plurality of CCFLs cannot readily be connected to one another in parallel, external electrode fluorescent lamps (EEFL) are currently being used as the light emitting lamp. The EEFLs can be arranged on a plane in parallel, and thus can be connected to one power source for driving.

A structure of the conventional direct type backlight unit will be explained with reference to FIGS. 1 and 2. FIG. 1 is a cross-sectional view showing an LCD device having a direct-type backlight unit in accordance with a related art. FIG. 2 is a cross-sectional, close up view showing a lower frame of the LCD device having the direct-type backlight unit in accordance with the related art.

As shown in FIG. 1, the direct-type backlight unit of the related art comprises a lower frame 11 for mounting components of a backlight, a reflection plate 13 installed at a surface of the lower frame 11, a plurality of light emitting lamps 15 arranged above the reflection plate 13 with a certain gap, a diffusion plate 17 arranged above the light emitting lamps 15 with a certain gap, a plurality of optical sheets 19 formed on the diffusion plate 17, a guide panel 21 formed at each edge of the lower frame 11, and a liquid crystal display (LCD) panel 31 mounted at a panel mounting portion of the guide panel 21. Polarizers 33 and 35 are provided at a lower surface and an upper surface of the LCD panel 31, respectively. An upper frame 41 covering edges of the LCD panel 31 except a screen display portion is coupled to the guide panel 21 and the lower frame 11.

As shown in FIG. 2, the lower frame 11 has of a flat unit supporting portion 11a and a tapered panel supporting portion 11b. The lower frame 11 is formed of a metal material having an excellent thermal conductivity. An upper surface of the edge 11b of the lower frame 11 is formed to be flat so that the guide panel 21 can be mounted thereon. In turn, the LCD panel 31 is mounted on the guide panel 21.

A path of light transmitted to the LCD panel 31 in the direct-type backlight of the related art will be explained. Most of the light emitted from the light emitting lamps 15 is made to be directly incident on the diffusion plate 17. Some of the light is partially reflected by the reflection plate 13, thereby made to be incident on the diffusion plate 17. The reflection plate 13 prevents loss of light transmitted to the rear surface of the LCD panel 31.

The diffusion plate 17 scatters incident light to uniformly distribute the light onto the optical sheet 19. The optical sheet 19 collects the incident light from the diffusion plate 17 to maximize the brightness of the light and then transmits the light onto the LCD panel 31, thereby displaying an image on the LCD panel 31.

As mentioned above, in the backlight unit of the related art, the lower frame 11 is formed of a material having an excellent thermal conductivity. Therefore, a great amount of heat is transmitted to the panel supporting portion 11b of the lower frame 11. As apparent from the illustration of FIG. 1, heat transmitted to the lower frame 11 is partially transmitted to the upper frame 41 and the guide panel 21. Since the lower frame 11 is formed of a material having an excellent thermal conductivity, a great amount of heat is transmitted to the LCD panel 31. Accordingly, temperature is drastically increased in LCD panel 31.

In cases of a light source emitting a large amount of heat, such as a light emitting diode, the temperature of the LCD panel 31 can rise above the temperature at which the liquid crystal material begins to degrade. Additionally, reliability of the backlight is decreased due to the rising temperature as the heat affects consumption of power regardless of the optical source. Furthermore, severe heat changes of the LCD panel can generate wrinkles in the optical sheets very sensitive to thermal expansion, and thus cause inferior picture quality.

SUMMARY OF THE INVENTION

Accordingly, the present invention is directed to a backlight unit and an LCD device having the same that substantially obviates one or more problems due to limitations and disadvantages of the related art.

An object of the present invention is to provide a backlight unit that provides stable and reliable operation of an LCD device.

Another object of the present invention is to provide a backlight unit that minimizing transmission of heat generated from a light source.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a backlight unit includes a light source, a lower frame including of a lighting unit supporting portion for supporting the light source and a liquid crystal display (LCD) panel supporting portion having a lower thermal conductivity than the lighting unit supporting portion, a reflection plate formed between the light source and the lower frame, and an upper frame coupled to the lower frame.

In another aspect, a liquid crystal display (LCD) device includes an LCD panel, and a backlight unit, the backlight unit including a light source, a lower frame including a lighting unit supporting portion for supporting the light source and an LCD panel supporting portion having a lower thermal conductivity than the lighting unit supporting portion, a reflection plate formed between the light source and the lower frame, and an upper frame coupled to the lower frame, wherein the LCD panel is supported on the LCD panel supporting portion and enclosed by the upper and lower frames.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
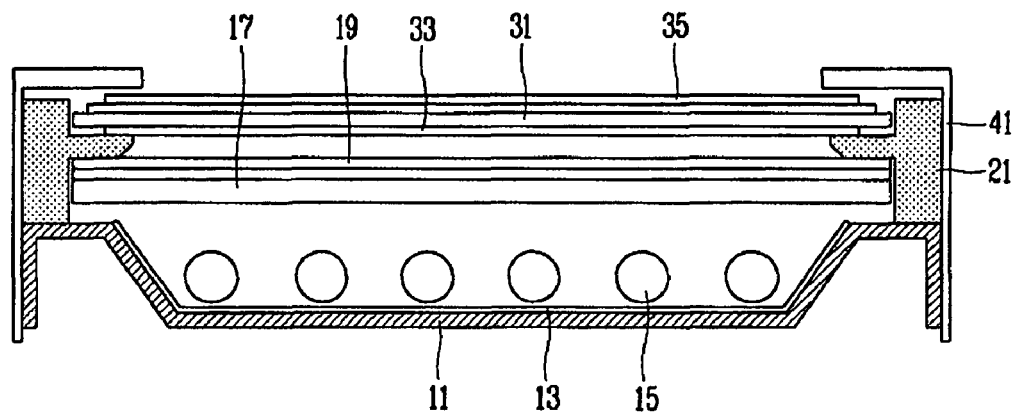
FIG. 1 is a cross-sectional view showing an LCD device having a direct-type backlight unit in accordance with a related art.
Figure 2:
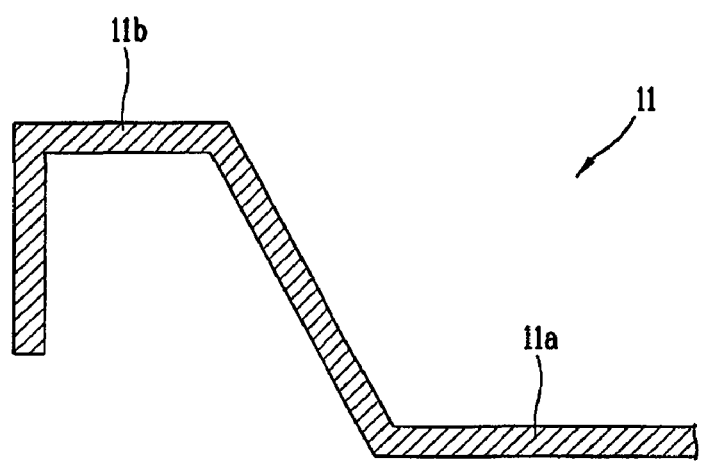
FIG. 2 is a cross-sectional, close up view showing a lower frame of the LCD device having a direct-type backlight unit in accordance with the related art.
Figure 3:
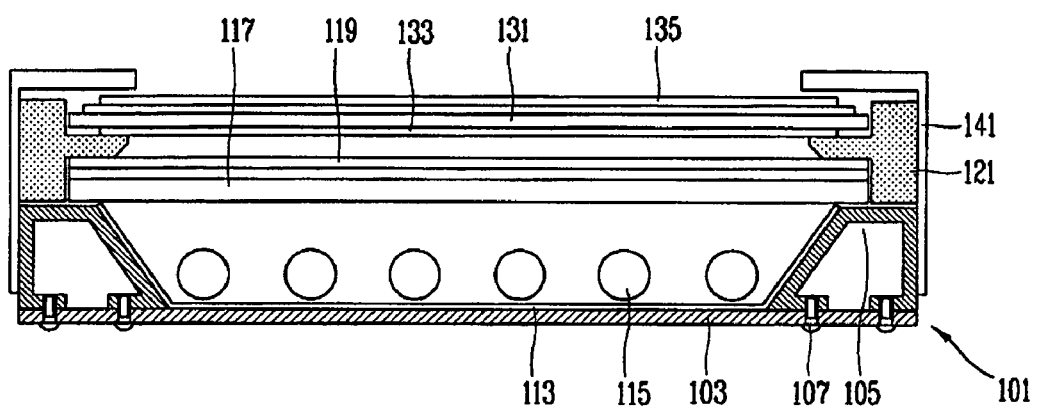
FIG. 3 is a cross-sectional view showing an LCD device having a direct-type backlight unit according to a first exemplary embodiment of the present invention.
Figure 4:
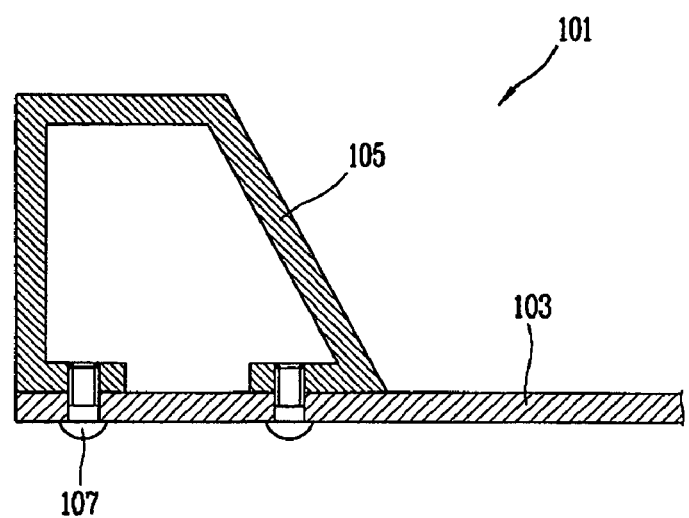
FIG. 4 is a cross-sectional, close up view showing an exemplary lower frame of the LCD device having a direct-type backlight unit according to the first exemplary embodiment of the present invention.

FIG. 3 shows a cross-sectional view of an LCD device having a direct-type backlight unit according to a first exemplary embodiment of the present invention. FIG. 4 shows a cross-sectional, close up view of a lower frame of the LCD device having a direct-type backlight unit according to the first exemplary embodiment of the present invention.

As shown in FIG. 3, an LCD device having a direct-type backlight unit according to the first exemplary embodiment of the present invention comprises a lower frame 101, a reflection plate 113 installed at an inner surface of the lower frame 101, a plurality of light emitting lamps 115 arranged above the reflection plate 113 with a certain gap, a diffusion plate 117 arranged above the light emitting lamps 115 with a certain gap, a plurality of optical sheets 119 formed on the diffusion plate 117, a guide panel 121 formed on a panel supporting portion 105 of the lower frame 101, and an LCD panel 131 mounted at a panel mounting portion of the guide panel 121. Polarizers 133 and 135 are provided at a lower surface and an upper surface of the LCD panel 131, respectively. An upper frame 141 covering edges of the LCD panel 131 except a screen display portion is coupled to the guide panel 121 and the lower frame 101.

As shown in FIG. 4, the lower frame 101 is composed of a flat unit supporting portion 103 and a tapered panel supporting portion 105. The tapered panel supporting portion 105 is coupled to the flat unit supporting portion 103 by screws 107 or other coupling means. Alternatively, the flat unit supporting portion 103 and the tapered panel supporting portion 105 can be coupled to each other not only by the screw or other coupling means, but also by bonding. While the flat unit supporting portion 103 is formed of a material having a high thermal conductivity, such as metal, the tapered panel supporting portion 105 is formed of a material having a low thermal conductivity, such as plastic.

A path of light transmitted to the LCD panel 131 through the direct-type backlight unit according to the first exemplary present invention will be explained. Most of light emitted from the light emitting lamps 115 is arranged to be directly incident on the diffusion plate 117. The reflection plate 113 is arranged such that the light partially reflected by the reflection plate 113 is also directed to be incident on the diffusion plate 117. The reflection plate 113 prevents loss of light transmitted to the rear surface of the LCD panel 131.

The diffusion plate 117 scatters incident light to uniformly distribute the light onto the optical sheet 119. The optical sheet 119 collects the incident light from the diffusion plate 117 to maximize the brightness of the light and transmits the light onto the LCD panel 131, thereby displaying an image on the LCD panel 131.

Figure 5:
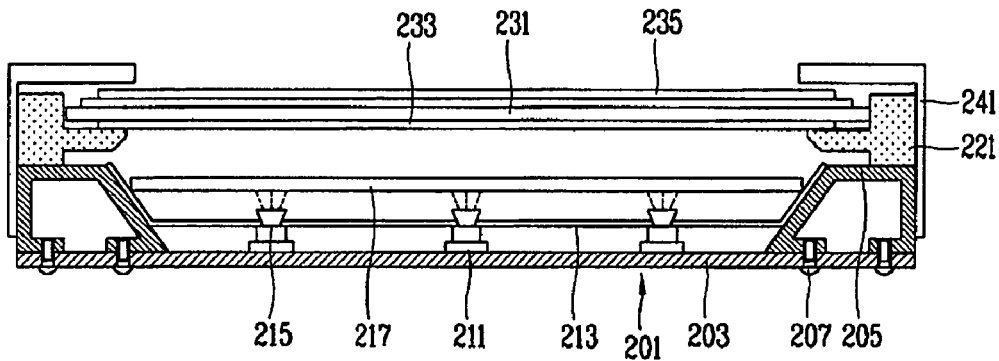
FIG. 5 is a cross-sectional view showing an LCD device having a direct-type backlight unit according to a second exemplary embodiment of the present invention.
Figure 6:
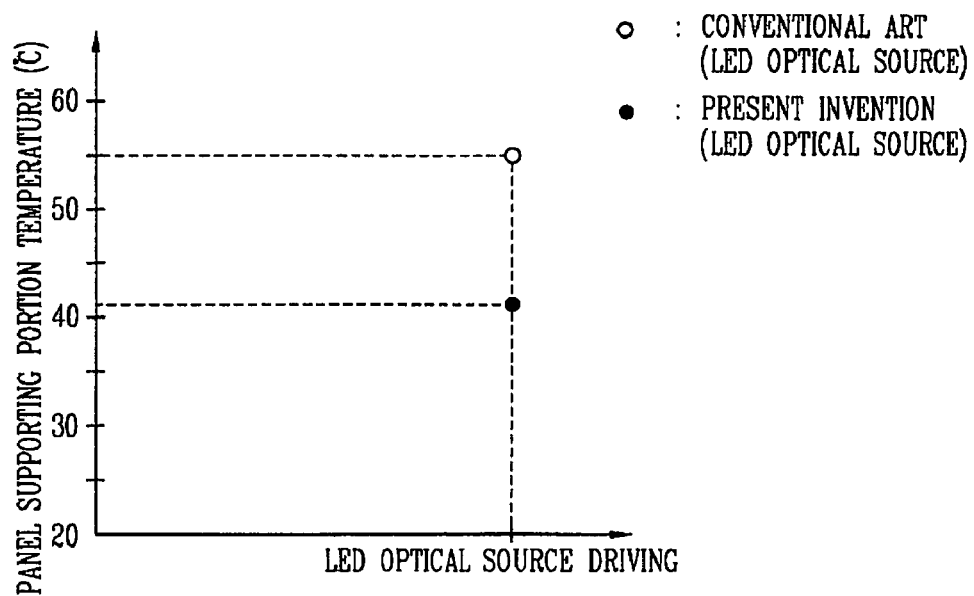
FIG. 6 is a graph showing a temperature variation at an edge of the lower frame of the second exemplary embodiment of FIG. 5.

A direct-type backlight unit and an LCD device having the same according to a second exemplary embodiment of the present invention will be explained with reference to FIGS. 5 and 6. FIG. 5 shows a cross-sectional view of an LCD device having a plurality of light emitting diodes (LEDs) as a light source according to the second exemplary embodiment of the present invention. FIG. 6 shows a graph illustrating variation of temperature at an edge of a lower frame of the second exemplary embodiment as shown in FIG. 5.

FIG. 5 illustrates an LCD device comprising a lower frame 201, a plurality of metal printed circuit boards (PCBs) 211 formed at an inner surface of the lower frame 201 with a certain gap, a plurality of LED optical sources 215 mounted on the PCBs 211, a reflection plate 213 arranged between the LED optical sources 215 and the PCBs 211 for reflecting light generated from the LED optical sources 215, a light guide plate 217 installed at a certain distance from the LED optical sources 215, a guide panel 221 mounted on a panel supporting portion 205 at an edge of the lower frame 201, and an LCD panel 231 disposed on a panel mounting portion of the guide panel 221. Polarizers 233 and 235 are provided at a lower surface and an upper surface of the LCD panel 231, respectively. An upper frame 241 covering edges of the LCD panel 231 except the screen display portion is coupled to the guide panel 221 and the lower frame 201.

As shown in FIG. 5, the lower frame 201 is composed of a flat unit supporting portion 203 and a tapered panel supporting portion 205. The tapered panel supporting portion 205 is coupled to the flat unit supporting portion 203 by screws 207 or other coupling means. Alternatively, the flat unit supporting portion 203 and the tapered panel supporting portion 205 can be coupled to each other not only by the screw or other coupling means, but also by bonding. While the flat unit supporting portion 203 is formed of a material having a high thermal conductivity, such as metal, the tapered panel supporting portion 205 is formed of a material having a low thermal conductivity, such as plastic.

A path of light transmitted to the LCD panel 231 from the LED optical sources 215 according to the second exemplary embodiment of the present invention will be explained. Most of light emitted from the LED optical sources 215 is arranged to be directly incident on the light guide plate 217. The reflection plate 213 is arranged such the light partially reflected by the reflection plate 213 is directed to be incident on the light guide plate 217. The reflection plate 213 prevents loss of light transmitted to the rear surface of the LCD panel 231.

As described above, the flat unit supporting portion 203 of the lower frame 201 is formed of a material having a high thermal conductivity while the tapered panel supporting portion 205 is formed of a material having a low thermal conductivity. Therefore, an amount of heat generated from the LED optical sources 215 transferred to the LCD panel is decreased, thereby reducing a rise of temperature along the upper and lower edges of the LCD device.

FIG. 6 illustrates a graph indicating variance of temperature of the panel supporting portion during a heat simulation of the LCD device of the related art and the LCD device according to the second exemplary embodiment of the present invention. According to the result of the heat simulation, the temperature of the panel supporting portion 205 of the LCD device according to the second exemplary embodiment of the present invention is approximately 12° C. lower than that of the related art. Accordingly, an amount of heat transmitted to the LCD panel is greatly reduced by the exemplary embodiments according to the present invention.

As described above, transfer of heat generated from the optical sources in the backlight unit and the LCD device having the same according to the present invention is minimized, thereby preventing the temperature of the LCD panel from rising. Accordingly, a uniform temperature is obtained, thereby providing a stable and a reliable operation of the LCD device.

It will be apparent to those skilled in the art that various modifications and variations can be made in the backlight unit of the present invention and LCD device having the same without departing form the spirit or scope of the invention. For instance, the backlight unit according to the exemplary embodiments of the present invention can be applied not only to an LED backlight but also an LCD device having the integral-type lower frame of the related art. Thus, it is intended that the present invention cover the modifications and variations of this invention provided they come within the scope of the appended claims and their equivalents.

What is claimed is:

1. A backlight unit, comprising:
   a light source having a plurality of light emitting diodes (LEDs);
   a lower frame including a flat unit supporting portion and a tapered panel supporting portion having a lower thermal conductivity than the flat unit supporting portion, wherein an inner side of the tapered panel supporting portion has a void space by connecting the flat unit supporting portion with the tapered panel supporting portion using coupling means including a screw, and wherein the flat unit supporting portion and the tapered panel supporting portion of the lower frame are formed of different materials and coupled to each other;
   a reflection plate arranged between the LEDs, wherein the reflection plate is installed at an inner surface of the lower frame and is in contact with the tapered panel supporting portion of the lower frame; and
   an upper frame coupled to the lower frame.

2. The backlight unit of claim 1, wherein the flat unit supporting portion is formed of metal and the tapered panel supporting portion of the lower frame is formed of plastic.

3. A liquid crystal display (LCD) device, comprising:
   an LCD panel; and
   a backlight unit, the backlight unit including:
      a light source having a plurality of light emitting diodes (LEDs),
      a lower frame including a flat unit supporting portion and a tapered panel supporting portion having a lower thermal conductivity than the flat unit supporting portion, wherein an inner side of the tapered panel supporting portion has a void space by connecting the flat unit supporting portion with the tapered panel supporting portion using coupling means including a screw, and wherein the flat unit supporting portion and the tapered panel supporting portion of the lower frame are formed of different materials and coupled to each other, wherein the flat unit supporting portion and the tapered panel supporting portion is formed of metal and the tapered panel supporting portion is formed of plastic;
      a reflection plate arranged between the LEDs, wherein the reflection plate is installed at an inner surface of the lower frame and is in contact with the tapered panel supporting portion of the lower frame; and
      an upper frame coupled to the lower frame,
      wherein the LCD panel is supported on the tapered panel supporting portion of the lower frame and enclosed by the upper and lower frames.

4. The LCD device of claim 3 further comprising:
   a diffusion plate disposed over the light emitting diodes; and
   a plurality of optical sheets disposed over the diffusion plate.

5. The LCD device of claim 3 further comprising:
   a printed circuit board (PCB) mounted on the flat unit supporting portion of the lower frame and connected to the LEDs; and
   a light guide plate disposed over the LEDs.

6. The LCD device of claim 5, wherein the reflection plate is arranged between the LEDs and the PCB.

7. A liquid crystal display (LCD) device, comprising:
   an LCD panel; and
   a backlight unit, the backlight unit including:
      a light source, wherein the light source includes a plurality of light emitting diodes (LEDs);
      a diffusion plate disposed over the light source;
      a plurality of optical sheets disposed over the diffusion plate;
      a lower frame including a flat unit supporting portion and a tapered panel supporting portion having a lower thermal conductivity than the flat unit supporting portion, wherein the flat unit supporting portion is formed of metal and the tapered panel supporting portion is formed of plastic, and wherein an inner side of the tapered panel supporting portion has a void space by connecting the flat unit supporting portion with the tapered panel supporting portion using coupling means including a screw;
      a reflection plate arranged between the LEDs, wherein the reflection plate is installed at an inner surface of the lower frame and is in contact with the tapered panel supporting portion of the lower frame;
      an upper frame coupled to lower frame, wherein the LCD panel is supported on the LCD panel supporting portion and enclosed by the upper and lower frames;
      a printed circuit board (PCB) mounted on the flat unit supporting portion and connected to the LEDs; and
      a light guide plate disposed over the LEDs.

* * * * *